US012610224B2

(12) United States Patent
Monsa Chermon et al.

(10) Patent No.: US 12,610,224 B2
(45) Date of Patent: Apr. 21, 2026

(54) DETECTION OF REMOTELY CONTROLLED AERIAL VEHICLE THROUGH A MANAGED NETWORK

(71) Applicant: D-FEND SOLUTIONS AD LTD., Raanana (IL)

(72) Inventors: Assaf Monsa Chermon, Kfar Yedida (IL); Nadav Arie, Tel Aviv (IL); Yaniv Benbenisti, Ra'anana (IL)

(73) Assignee: D-FEND SOLUTIONS AD LTD., Raanana (IL)

( * ) Notice: Subject to any disclaimer, the term of this patent is extended or adjusted under 35 U.S.C. 154(b) by 336 days.

(21) Appl. No.: 18/325,940

(22) Filed: May 30, 2023

(65) Prior Publication Data

US 2024/0007837 A1 Jan. 4, 2024

(30) Foreign Application Priority Data

May 30, 2022 (IL) .......................................... 293455

(51) Int. Cl.
*H04W 8/00* (2009.01)
*H04W 84/06* (2009.01)

(52) U.S. Cl.
CPC ............ *H04W 8/005* (2013.01); *H04W 84/06* (2013.01)

(58) Field of Classification Search
CPC ....... H04W 8/005; H04W 12/22; H04W 4/02; H04W 84/042; H04W 84/06; H04K 3/822; H04K 3/92; B64U 2201/20; B64C 39/024; H04L 67/12
See application file for complete search history.

(56) References Cited

U.S. PATENT DOCUMENTS

| | | | |
|---|---|---|---|
| 9,524,648 B1 | 12/2016 | Gopalakrishnan et al. | |
| 9,805,273 B1 * | 10/2017 | Seeber | G06V 20/52 |
| 10,044,465 B1 * | 8/2018 | Hetsko | F41H 13/0075 |
| 10,051,475 B2 | 8/2018 | Shattil et al. | |
| 11,585,886 B1 * | 2/2023 | Meyer | H04B 1/0003 |
| 2017/0092138 A1 * | 3/2017 | Trundle | H04K 3/82 |
| 2018/0062785 A1 * | 3/2018 | Hodge | H04K 3/825 |
| 2018/0128895 A1 * | 5/2018 | Seeber | G08G 5/55 |
| 2019/0020404 A1 * | 1/2019 | Russell | G08G 5/55 |

(Continued)

FOREIGN PATENT DOCUMENTS

| | | | | |
|---|---|---|---|---|
| CN | 107408351 A | * 11/2017 | ............ | H04W 4/022 |
| CN | 111708049 A | * 9/2020 | ........... | G01S 19/215 |

(Continued)

OTHER PUBLICATIONS

Savio Sciancalepore et al., "PiNcH: an Effective, Efficient, and Robust Solution to Drone Detection via Network Traffic Analysis," Computer Networks, Dec. 6, 2019.

*Primary Examiner* — Shean Tokuta
(74) *Attorney, Agent, or Firm* — Reches Patents

(57) ABSTRACT

A computerized method for detecting a remotely-controlled aerial vehicle (RCAV) related communication unit in one or more managed networks. The method may include obtaining, using privileged access, communication related information about one or more members of the one or more managed networks or searching for the RCAV related communication unit. The searching is based, at least in part, on the communication related information; and responding to a detecting of the RCAV related communication unit.

43 Claims, 7 Drawing Sheets

Obtaining, using privileged access, communication related information about one or more members of the one or more managed networks 110

Searching for the RCAV related communication unit 120

Responding to a detecting of the RCAV related communication unit 130

(56)         References Cited

U.S. PATENT DOCUMENTS

| | | | | |
|---|---|---|---|---|
| 2019/0199756 A1 * | 6/2019 | Correnti | .......... | G08B 13/19613 |
| 2020/0064443 A1 * | 2/2020 | Yoon | ..................... | G01S 13/867 |
| 2020/0219408 A1 * | 7/2020 | Han | ......................... | G05D 1/10 |
| 2021/0043096 A1 | 2/2021 | Brown et al. | | |
| 2021/0112515 A1 * | 4/2021 | Zou | ......................... | G08G 5/26 |
| 2021/0206492 A1 | 7/2021 | Faccin et al. | | |
| 2021/0343154 A1 | 11/2021 | Faccin et al. | | |
| 2021/0407301 A1 * | 12/2021 | Zhang | ................... | H04W 4/025 |
| 2022/0166525 A1 * | 5/2022 | De Rosa | ................. | H04B 15/00 |
| 2022/0191698 A1 * | 6/2022 | Davis | ................... | H04W 4/021 |
| 2022/0214144 A1 * | 7/2022 | Indelicato | .............. | G01S 17/86 |
| 2022/0225471 A1 * | 7/2022 | Zhang | ..................... | G08G 5/53 |
| 2024/0007837 A1 * | 1/2024 | Monsa Chermon | .. | H04W 8/005 |
| 2024/0319356 A1 * | 9/2024 | Seibert | ................... | G01S 13/42 |

FOREIGN PATENT DOCUMENTS

| | | | | | | |
|---|---|---|---|---|---|---|
| CN | 111213103 | B | * | 5/2022 | .............. | G08G 5/59 |
| IL | 285554 | A | * | 12/2022 | .............. | H04K 3/92 |
| IL | 293455 | A | * | 12/2023 | ............ | H04L 67/12 |
| IL | 312258 | A | * | 6/2024 | .............. | H04K 3/65 |
| IL | 313673 | A | * | 8/2024 | | |
| KR | 102054089 | B1 | | 12/2019 | | |
| WO | WO-2016154945 | A1 | * | 10/2016 | ............ | H04W 4/022 |
| WO | 2018170734 | A1 | | 9/2018 | | |
| WO | WO-2020220854 | A1 | * | 11/2020 | ............ | H04W 12/06 |
| WO | WO-2022238765 | A1 | * | 11/2022 | .............. | H04K 3/65 |

* cited by examiner

Figure 1:
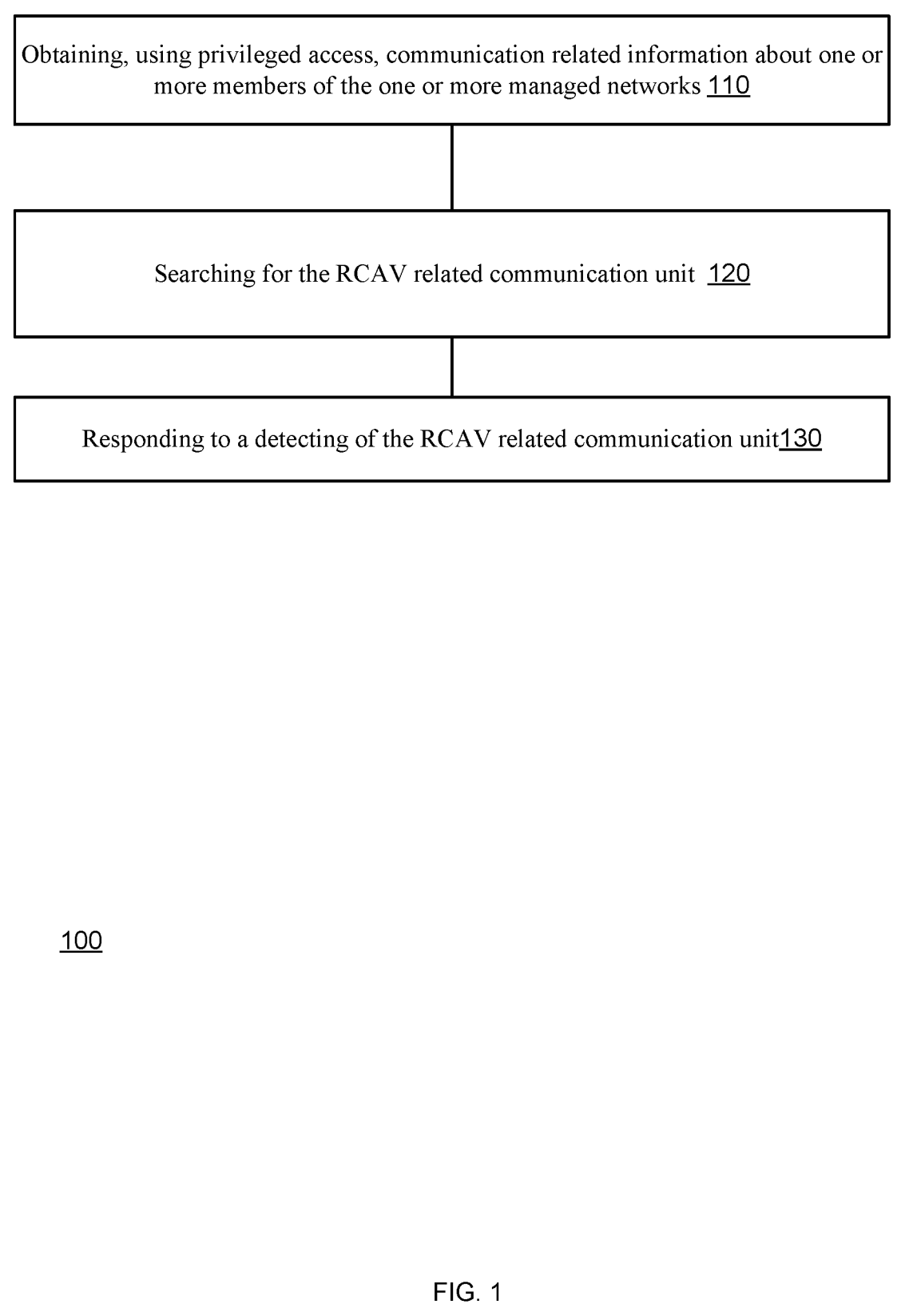

Obtaining, using privileged access, communication related information about one or more members of the one or more managed networks 110

Searching for the RCAV related communication unit 120

Responding to a detecting of the RCAV related communication unit130

DETECTION OF REMOTELY CONTROLLED AERIAL VEHICLE THROUGH A MANAGED NETWORK

BACKGROUND

Remotely controlled aerial vehicles (RCAVs, including Unmanned Aerial Vehicles, UAVs, drones, etc.) have developed in the past two decades to become a common tool for various uses like surveillance, aerial photography, remote delivery, and entertainment—and is even used for military scenarios like visual intelligence gathering or direct attack. While most of the uses are generally considered beneficial, and most users act responsibly, there are many cases where such vehicles are used irresponsible or maliciously. Following the development and more common use of RCAVs, technologies that can monitor their usage, alert w % ben this usage is unauthorized or risky, and at times also mitigate such risk, have emerged. Many RCAVs use direct radio communication (RF) for their control channel, and some detection, identification, and mitigation methods are countering the threat by responding to this type of communication.

Recently, some remotely controlled aerial vehicles make use of LTE networks to connect with their remote controllers. Such RCAV communication will not be detected in methods that respond to RF communication, as such communication has some unique features and characteristics that are different than direct radio communication. Some of the differences relate to the fact that by using LTE, drone communication looks identical—radio speaking—to any other phone conversation through the same LTE network. It is hence very hard to identify an RCAV communication. Even if identified, this communication is as protected as voice communication in the same network, it is even difficult to keep track of that communication because of the nature of cellular communication. And finally, disrupting the communication between a RCAV and its remote controller, or taking over that communication channel, becomes a major challenge to system that try to protect against a RCAV used badly.

One common technology that may come into mind when addressing such threat is the use of IMSI grabbers/catchers, SUPI grabbers/catchers, and similar technologies.

International mobile subscriber identity (IMSI) catcher is a telephone eavesdropping device used for intercepting mobile phone traffic and tracking location data of mobile phone users. Essentially a "fake" mobile tower acting between the target mobile phone and the service provider's real towers, it is considered a man-in-the-middle (MITM) attack. The 3G wireless standard offers some risk mitigation due to mutual authentication required from both the handset and the network. However, sophisticated attacks may be able to downgrade 3G and LTE to non-LTE network services which do not require mutual authentication. IMSI-catchers are used in a number of countries by law enforcement and intelligence agencies (WWW.WIKIPEDIA.ORG).

RCAVs that use LTE as their communication channel may be detected or monitored using IMSI catchers—which is not a complete solution of the threat. However, it is expected that in the near future various RCAVs will use managed networks equipped with security measures that will make IMSI catchers obsolete.

Additionally, there are scenarios in which using an IMSI catcher, even if applicable, is not practical. The use of IMSI catchers requires the physical and closed proximity presence near the RCAV, and without prior knowledge that such RCAV may appear, it is not practical to monitor large areas.

The use of techniques such as IMSI catcher may also affect unrelated users of the same network, as well as miss some of the RCAVs that are using the network.

There are also other types of managed networks that RCAVs may communicate through, which do not use a cellular type of connection.

There is a growing need to provide an efficient method for detecting and/or locating and/or mitigating rogue RCAVs that use such IMSI catcher-immune managed networks.

SUMMARY

There may be provided systems, methods, and computer readable medium as illustrated in the specification.

There may be provided a method for RCAV detection.

BRIEF DESCRIPTION OF THE DRAWINGS

The embodiments of the disclosure will be understood and appreciated more fully from the following detailed description, taken in conjunction with the drawings in which:

FIG. 1 illustrates an example of a method:

DESCRIPTION OF EXAMPLE EMBODIMENTS

Figure 2:
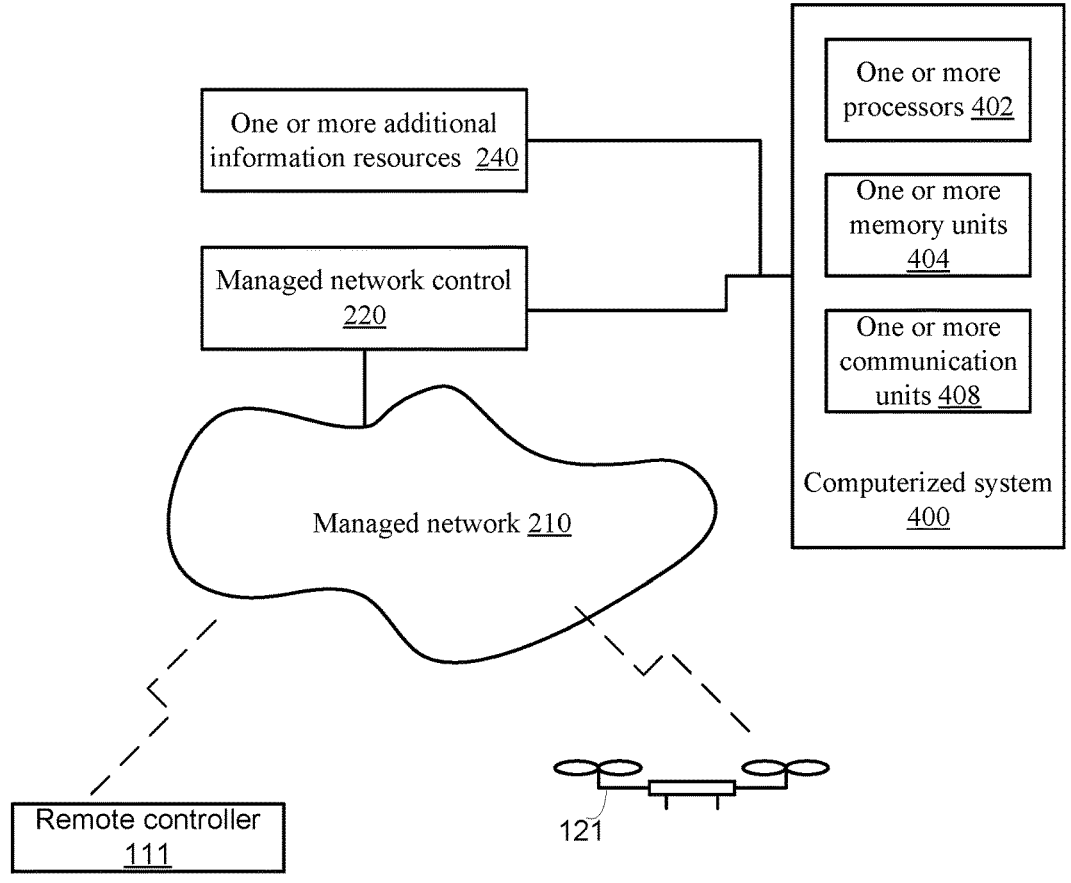
FIG. 2 illustrates an example of a system and its environment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a method, a system, and a computer readable medium for RCAV detection and/or location and/or mitigation.

A RCAV may be programmed and/or otherwise configured to complete a task and/or a mission. This may include arriving to a destination and/or performing an operation when arriving to the destination. A RCAV may also be regarded as arriving to the destination when the destination is in reach of the RCAV. The destination is in reach of the RCAV when the RCAV is positioned at a location that enables the RCAV to complete the task related to the destination. The operation may include the photography of a target, exploding a target associated with the destination, delivering a payload (that may or may not be a damaging payload) to the target, performing an electronic countermeasure, acquire information regarding the target, direct accurate ammunition to the target, and the like. The mitigation of the RCAV many include preventing the RCAV to complete his task and/or mission.

When referring to a "remote controller", this includes, besides a remote controller device, any other controlling device like a ground station, Virtual Reality goggles, smartphone or tablet, control stick, telemetry module, secondary remote controller (e.g. gimbal controller), smart controllers (controllers that include a screen and are sometimes programmable), and the like.

A RCAV may communicate, using a RCAV communication unit, with one or more other devices such as a remote controller that has its own communication unit. The RCAV communication unit and any communication unit that communicates with the RCAV communication unit are referred to as a RCAV related communication unit. A RCAV related communication unit is a communication unit that participated in a communication between a RCAV and one or more other devices.

A managed network is a network that may transfer RCAV related communication between the RCAV and another party—while neither one of the RCAV and the other party manages the network.

For example—In many cases, the RCAV connect with its remote controller or with other devices through direct radio communication (RF). In other cases, such communication may be done through a separate network that may be managed by entities unrelated to the RCAV, where both the RCAV and the remote controllers become members of that network. Each of them communicates with the network, and the network transfers that communication to the other. An example for that is LTE network, where each of the RCAV and its remote controller may be members of that network (and may have a SIM card, eSIM, IMSI\SUPI, etc.) Such managed network will commonly have some level of privileged access (or managed privileges) to the network managers and infrastructure that may allow monitoring of the communication, packet inspection, denial of access to members, member management, member identity database access, and more.

There may be provided a method for accessing one or more managed networks through the managed privileges to monitor some or all members of the one or more managed networks (within the available and possibly allowed boundaries) and extract the existence of one or more members in the managed network that are part of a RCAV connection (RCAV related communication units).

The connection used by the method with a command and control system that may receive data from multiple systems may use the same managed network for its communication, or may communicate externally from the network through other means.

Some of the aerial traffic may involve managed fleets that may or may not use the same managed network for communication.

The method may interface with UAV fleet management methods (e.g. Amazon Prime Air) in order to verify the identity of a UAV that is part of the fleet, or in order to alert the fleet management method from threats that a UAV that is part of the fleet is posing, or on threat posed on a UAV that is part of the fleet.

The method may receive information from UAV fleet management methods that it can combine with information it receives from the managed network in order to create a combined aerial status.

The method may interface with other management methods (e.g. U-Space, UTM) for similar purposes.

The method may interface with other systems that contain information on aerial objects, manned or unmanned, for similar purposes.

There may be a case where several such managed networks, which are not connected or loosely connected with each other, are used for communication with different UAVs in the same aerial vicinity. In such cases the aerial status received from these networks may be aggregated by one—or more—aggregating or command and control method.

Note that these managed networks may include communication that is not public. Hence, privileges for some of the actions may involve receiving confirmation from an authority (e.g. legal, Governmental, network management) to use these actions. Requests for such confirmation may be initiated automatically by the method and such actions may be performed following that confirmation as received by the method through automated or manual means.

There may be provided a method for detecting a RCAV related communication unit in managed networks.

FIG. 1 illustrates a computerized method 100 for detecting a RCAV related communication unit in one or more managed networks. The method is referred to as a computerized method as it may be executed by a computerized system.

Method 100 may start by step 110 of obtaining, using privileged access, communication related information about one or more members of the one or more managed networks.

The obtaining may include receiving, generating, calculating, determining, retrieving, fetching, monitoring, processing, and the like.

The one or more managed networks may include a network that may be a cellular network, a fifth generation (5G) cellular network, a proprietary owned managed network (for example—Amazon Prime Air network), a U-Space network, a UTM, and the like.

The obtaining may be triggered manually, may be triggered based on an event, may be triggered automatically without human intervention.

The obtaining may be obtained during a general search process or during a targeted search process. A targeted search process is aimed to detect specific members of the one or more managed networks and/or detect members that exhibit specific characteristics.

Step 110 may be followed by step 120 of searching for the RCAV related communication unit. The searching may be based, at least in part, on the communication related information.

Thus—step 120 may be based solely on the communication related information. Alternatively—step 120 may be based on the communication related information and on additional information.

The additional information may be obtained using the privileged access, may be obtained without using the privileged access, may be obtained from the one or more managed networks, may be obtained from one or more sources other than the one or more managed networks, and the like.

Step 120 may, for certain uses, not be necessary. One example is when the list of suspicious network members was obtained externally, and step 130 was triggered accordingly when such members are active in the network.

Both steps 110 and 120 may, for certain uses, not be necessary. One example is when a list of current RCAVs is provided to the system along with their network identifiers, and step 130 was triggered without the system obtaining any additional information with its actions.

The searching may include at least one out of:

Performing an identification through the network identifier, by the network carrier/operator, as being a RCAV related device or being related to a subscriber or member of the managed network that may be identified to the network manager as being associated with RCAV operations.

Performing an identification through cooperation with privileged manager in the network connection parameters, for example: (i) The other parties in a closed connection (e.g. P2P, phone connection). (ii) Data or network addresses accessed (e.g. web addresses, IP addresses that were accessed).

Fingerprinting of data transferred in the communication (e.g. through data inspection).

Utilizing data available through privileged access (or a combination of privileged and non-privileged data) that is typical to a RCAV operation (e.g. location data that is typical to a RCAV flight).

Identifying and recording communication parameters that may be later used to perform additional actions, through the managed network, or through additional means, that relate to the RCAV or its operator.

In some managed network such as a cellular network (e.g. 3G, 4G, 5G), that allows law enforcement agencies (LEA) to have privileged access (whether or not it requires additional authorization for access e.g. court order), there are also device identifiers for a communication unit that is used to connect to the network. Such identifiers (e.g. IMEI in cellular communication) may be used to identify the member as using a RCAV communication unit, and the method may be alerted to it directly by the carrier, or the LEA may—through LI privileges—identify and alert the system. The connection can be associated with another subscriber that is already known to be a RCAV remote controller. The access may be to a known RCAV related network (e.g. one that is operated by the RCAV manufacturer). The fingerprinted data may be a data packet that is typical to the RCAV application protocol. Location data in some cellular networks (notably 5G) may contain altitude data or movement data that is typical to a RCAV flight, and other cellular networks (e.g. 3G, 4G) which do not have altitude data may still show a track that can typically only be performed by a flying object. Identification of the related IMSI\SUPI or IMEI, and details on the owners or operators of the related devices, if such details are available through the privileged access to the managed network, may be shared with LEA in order to intercept the RCAV pilot or otherwise address the threat.

Receive through the privileged access, or through other data available in the network, information related to the RCAV or its user (e.g. location/altitude data in 5G networks, personal information of the subscriber available to the network carrier/operator) and combine it with the data extracted from the RCAV communication.

Once a RCAV connection has been identified by the method, the method may—automatically or through initiation by the system operator—extract the data that is transferred between the RCAV and its remote controller, or between the RCAV and other destinations (e.g. the RCAV manufacturer servers or cloud servers, networked repositories of RCAV manufacturers, networked agents who collect RCAV data, communication with a command and control of a RCAV fleet, etc.). According to that data, the method may determine whether the RCAV is of interest to the method operator (e.g. located within a protected area), the method may use additional data received through other sensors, or through previous knowledge, or through additional tests done following the alert received to determine whether the RCAV is of interest to the method operator.

Searching for a member of the one or more managed networks that accessed an information resource that is RCAV related.

Searching for a member of the one or more managed networks that uses a communication protocol that is RCAV related.

Searching for a member of the one or more managed networks that may include a communication unit of a type that is RCAV related.

Searching for a communicated content that is RCAV related.

Searching for a member of the one or more managed networks that is identified by an identifier that is RCAV related.

Searching for a connection that has characteristics that are typical to RCAV related communication.

Searching based, at least in part, on movement information of a member of the one or more managed networks.

Searching based, at least in part, on location information of a member of the one or more managed networks.

Searching based, at least in part, on personal information regarding one or more persons related to a member of the one or more managed networks.

Searching for a RCAV related connection and analyzing content conveyed over the RCAV related connection.

Step 120 may be followed by step 130 of responding to a detecting of the RCAV related communication unit.

Step 120 may be redundant, and in these cases step 130 may follow step 110.

Step 130 may include at least one of the following steps:

Following the identifying—further analyzing the content of the communication or its characteristics in order to extract information that is related to the monitoring of the aerial traffic, and to the possible mitigation of threats this traffic may cause. In a managed network, the access to that level of data and the ability to manipulate the data transferred or block/filter it may be allowed through the privileges of the network manager or through an API that is provided by the network operator.

The method may filter the information received, depending on additional parameters (e.g. location of the end customer of the method, range of interest for the method operator, altitude, size, operative range of UAV) and present information based on that filtering to the customer or method operator.

Generating an alert to be sent to various entities such as a carrier, or the LEA may—through LI privileges—identify and alert the system.

The identification of the related IMSI\SUPI or IMEI, and additional information that may be obtain through the privileged access, may be shared with LEA in order to intercept the RCAV pilot or otherwise address the threat.

Integrating information related to more than one location in order to generate a global or general alert that combines the alerts given per each location. The method may use location information in order to predict the future path of a RCAV, or in order to complement a partial path available to it.

Using the prediction of a future path in order to alert the method operator from a predicted threat or in order to determine the need of additional actions (e.g. take over the communication of the UAV)

Saving a repository of the history of detections of UAVs and actions taken for purposes of forensic research, statistical data collection, bookkeeping, court hearings, or other purposes.

In case the method has determined (through automated commands or through initiation by the method operator) that the RCAV threat should be mitigated, the method may address that threat through one or more means.

Tracking and following the RCAV post such mitigation.

Step 130 may include at least one out of:

Generating and sending a RCAV indication.

Stopping a progress of a RCAV that may include the RCAV related communication unit.

Stopping a progress of a RCAV that communicates with the RCAV related communication unit.

Disconnecting a RCAV related communication.

Disconnecting, using the privileged access, a RCAV related communication.

Altering a RCAV related communication.

Gaining control of a RCAV that may include the RCAV related communication unit.

Gaining control of a RCAV that communicates with the RCAV related communication unit.

Requesting the one or more managed network to change a mode of communication of a RCAV.

Performing the responding based, at least in part, on a location of a RCAV related to the RCAV related communication unit.

Facilitating one or more counter measures by affecting the communication of the RCAV related unit.

Transferring to another computerized entity information regarding the RCAV related communication unit.

Obtaining, using the privileged access, additional information that differs from the communication related information.

Obtaining additional information.

Monitoring the one or more members.

Disconnecting the communication between the RCAV and its controller (e.g. remote controller/command and control/ground station) through commands given to the managed networked carrier/manager.

Intercepting and/or filtering and/or altering the communication data between the RCAV and its controller in order to prevent the RCAV from receiving commands or inject other commands to the communication in a way that would disrupt the operation of the RCAV or the control of the controller over the RCAV. This may include for example: disruptive packets that would cause one or more elements of the UAV or the remote controller to malfunction or alter its behavior. See, for example, U.S. Pat. No. 10,728,906, U.S. patent application Ser. No. 17/444,907, U.S. patent application Ser. No. 17/456,798, and U.S. patent application Ser. No. 17/129,629—all being incorporated herein in their entirety.

Disconnecting other channels of communication that the RCAV has available (e.g. direct radio communication with its remote controller) in order to cause the RCAV to use the managed network as its sole channel of communication, then possibly proceed with some form of disruption through the ability to alter or control the information going through the network.

Changing parameters of communication that may cause the RCAV to stop responding to commands sent by its remote controller Directly communicating with the RCAV in order to control it (e.g. send it home, send it to a safe route to a safe landing, land it in place).

Alerting an end user by communication with him over the managed network (and possibly through an application used to control the RCAV) to the problems caused by the RCAV—for example, through alert sent by the network operator to the remote controller or to a cellular phone connected to the remote controller.

Alert the method operator to the existence of the RCAV and other data related to the RCAV.

Accepting commands from the method operator.

Activating pre-programmed commands automatically.

Verifying an identity of an operator of an RCAV related to the RCAV related communication unit.

Verifying an identity of an operator of an RCAV related to the RCAV related communication unit and then acting in response to an outcome of the verifying.

Verifying an identity of a RCAV related to the RCAV related communication unit.

Verifying an identity of a RCAV related to the RCAV related communication unit and then acting in response to an outcome of the verifying. For example ignoring a unverified identity, performing any other example of step 130 mentioned above.

Jumping to step 120.

Jumping to step 110.

FIGS. 2-5 illustrates a computerized system 400 and different environments 300. The computerized system 400 may be located at other environments. In any of these figures the RCAV and its remote controller may be in direct communication with each other and/or may be in an indirect communication with each other—for example via the managed network.

In FIG. 2 the environment 300 includes (i) managed network 210 that is managed by managed network control 220, (ii) one or more additional information sources 240 such as data bases, management of other networks, managed network members data structures, communication units data structures for provided information of users and/or purchasers of aerial communication units and/or of communication units and/or of aerial components. (iii) RCAV such as drone 121, (iv) remote controller 111.

Figure 3:
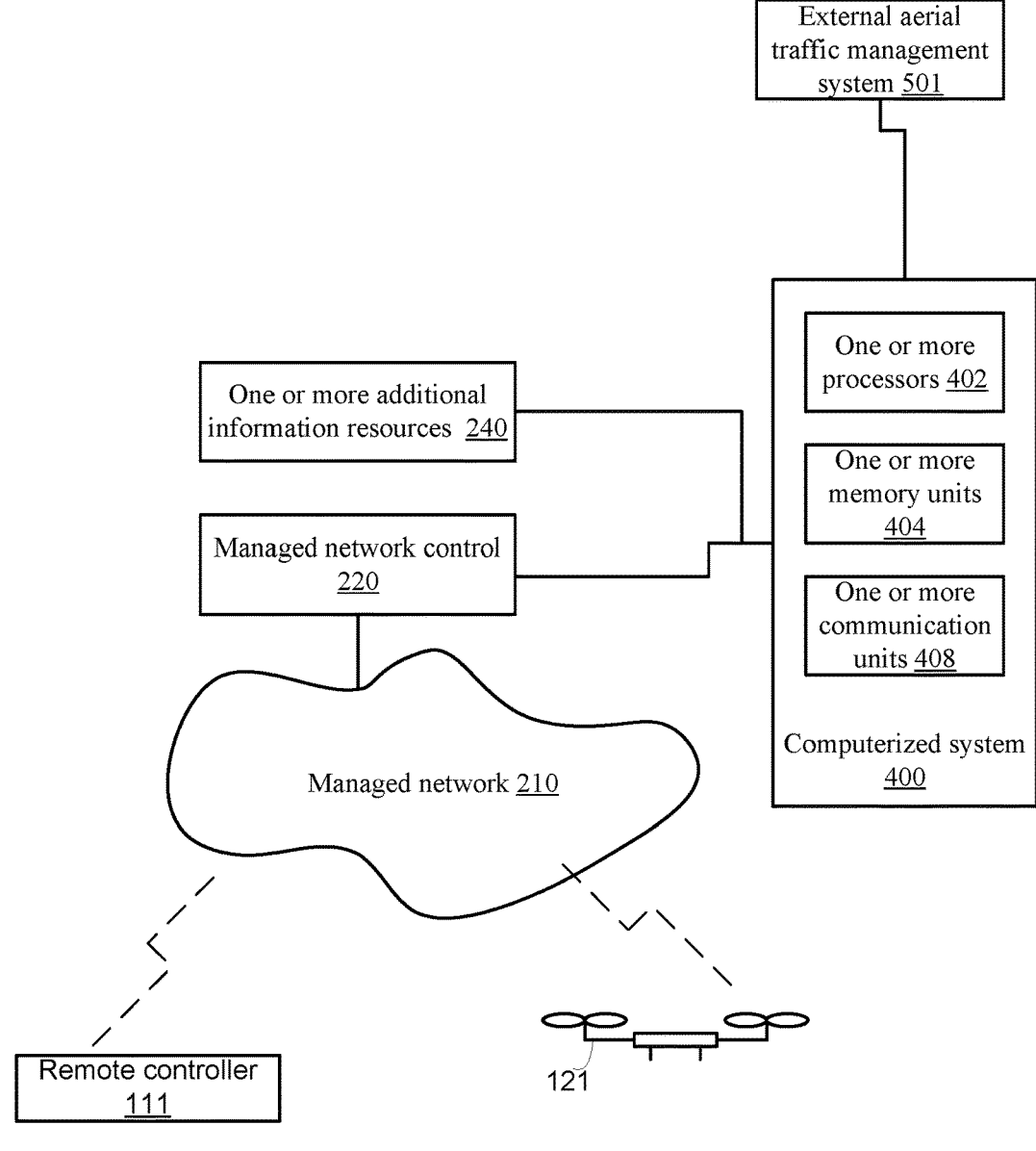
FIG. 3 illustrates an example of a system and its environment.

In FIG. 3 the environment 300 includes (i) managed network 210 that is managed by managed network control 220, (ii) one or more additional information sources 240 such as data bases, management of other networks, managed network members data structures, communication units data structures for provided information of users and/or purchasers of aerial communication units and/or of communication units and/or of aerial components, (iii) RCAV such as drone 121, (iv) remote controller 111, and (v) external aerial traffic management system 501.

Figure 4:
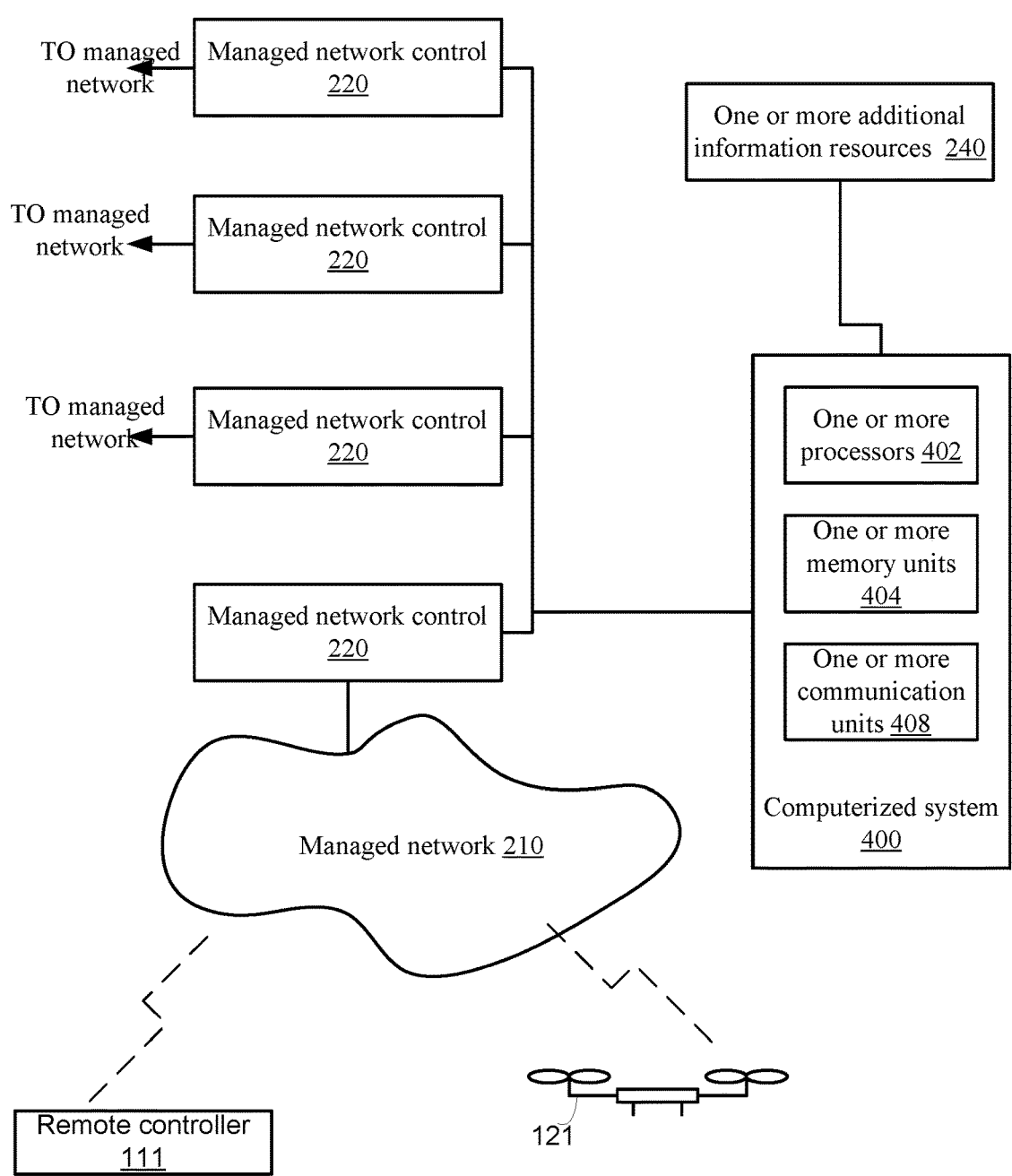
FIG. 4 illustrates an example of a system and its environment.

In FIG. 4 the environment 300 includes (i) multiple managed networks (only one management network 210 is shown for simplicity of explanation), each managed network is managed by managed network control such as managed control unit 220, (ii) one or more additional information sources 240 such as data bases, management of other networks, managed network members data structures, communication units data structures for provided information of users and/or purchasers of aerial communication units and/ or of communication units and/or of aerial components, (iii) RCAV such as drone 121, and (iv) remote controller 111.

Figure 5:
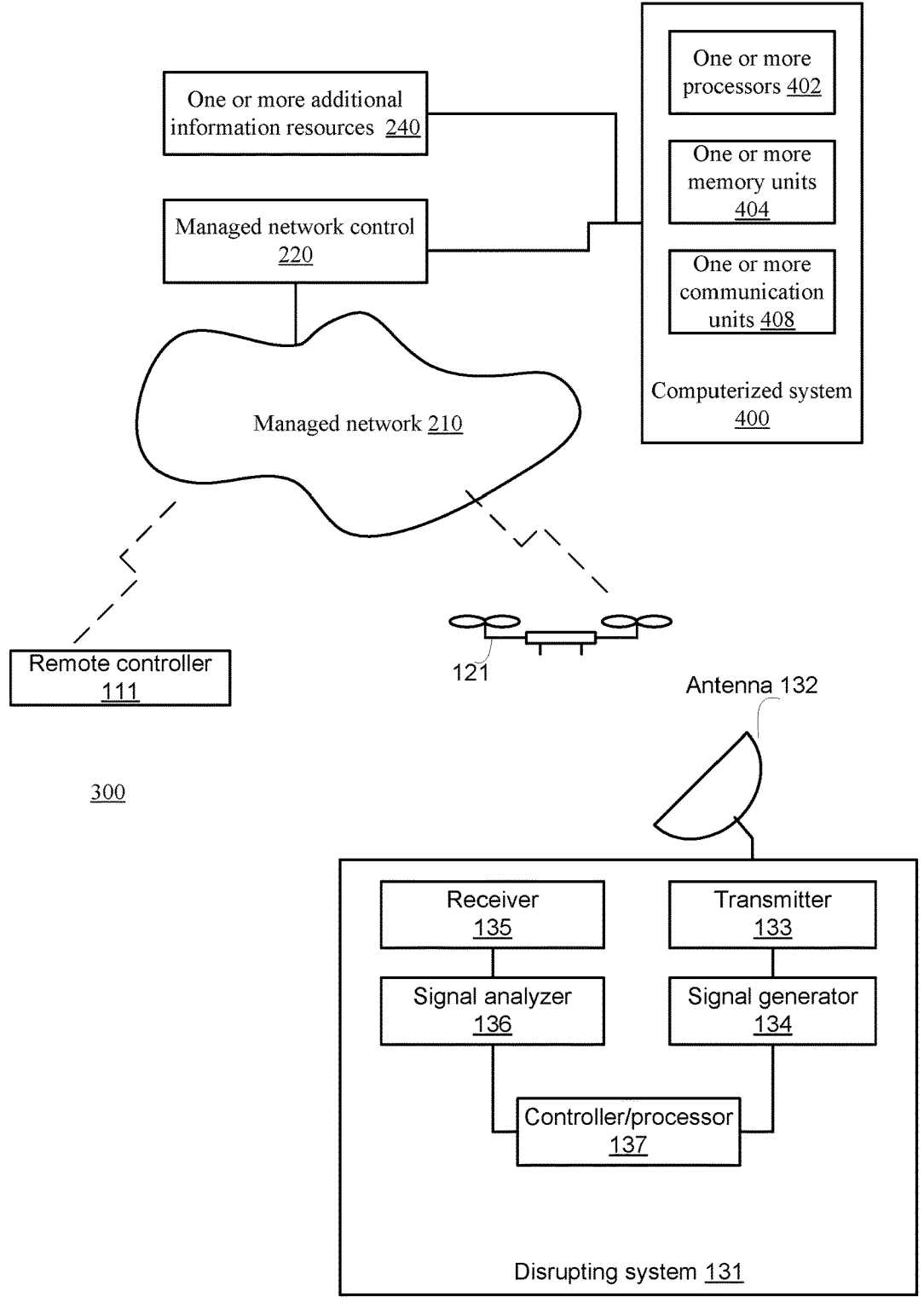
FIG. 5 illustrates an example of a system and its environment.

In FIG. 5 the environment 300 includes (i) managed network 210 that is managed by managed network control 220, (ii) one or more additional information sources 240 such as data bases, management of other networks, managed network members data structures, communication units data structures for provided information of users and/or purchasers of aerial communication units and/or of communication units and/or of aerial components, (iii) RCAV such as drone 121, (iv) remote controller 111, and (v) a disruption system 131.

The disrupting system 131 is illustrated as including antenna 132, a transmitter 133, a signal generator 134, a receiver 135, a signal analyzer 136 and a controller/processor unit 137.

Antenna 132 may be used for receiving signals transmitted from UAV 121 and/or from the remote controller 111. These signals are sent to receiver 135 that provides detection signals to signal analyzer 136 that may analyze the signals. The analysis may be spectrum analysis, timing analysis, demodulation, descrambling, error correcting, decoding and the like. The signal generator 134 may generate the disruptive signals to be transmitted by transmitter 133 via antenna 132.

It should be noted that the disruption system may have one or more transmission antennas that are separate from one or more reception antennas.

The disrupting system 131 may include only part of the units illustrated in figure and/or may include more or other units.

The controller/processor may be a controller and/or a processor. The controller may control the operation of the disrupting system and the processor may receive the analysis of received signals from signal analyzer 136 and determine which disrupting commands to transmit and when to transmit them.

The controller/processor may perform the functionality of the signal analyzer and/or of the signal generator 134.

Computerized system 400 includes one or more processors 402 (that include one or more processing circuits), one or more memory units 404 for storing instructions and/or information, and one or more communication units 408. Computerized system 400 may be in communication with disrupting system 131.

The one or more communication units may include one or more wireless receivers and/or one or more wireless transmitters and/or one or more communication elements for communicating in a wired manner and/or one or more communication elements for facilitating communication between elements of the computerized system and/or one or more communication elements for facilitating communication between the computerized system and entities outside the computerized system.

The computerized system may be a part of a mitigating system, a part of a monitoring system, a part of a stand-alone computer, a part of a cloud computing environment—or may not be a part of a mitigating system, may not be a part of a monitoring system, may not be a part of a stand-alone computer, may not be a part of a cloud computing environment, and the like. The computerized system may have a centralized or distributed architecture. The computerized system may be a server, a desktop computer, a mobile device, a smartphone, a hardware accelerator, and the like.

Figure 6:
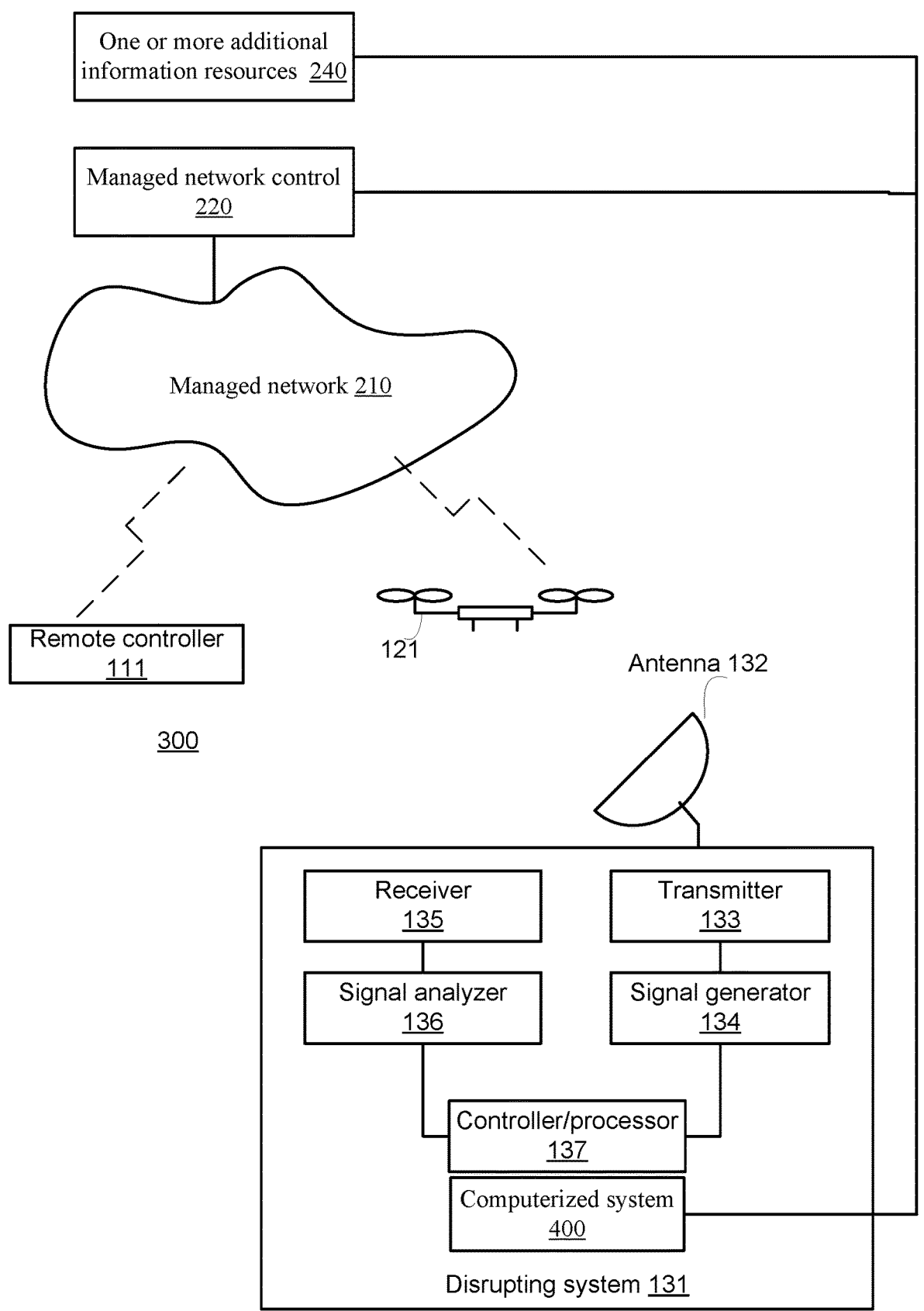
FIG. 6 illustrates an example of a system and its environment.

FIG. 6 illustrates a computerized system 400 and its environment 3). The computerized system 400 may be located at other environments. In FIG. 6 the computerized system 400 is included in disrupting system 131. It should be noted that one or more components of the computerized system may be implemented, at least in part, in the components of the disrupting system 131—for example the controller/processor 137 may executed at least some of the tasks executed by one or more processors 402 of computerized system of FIG. 2.

Figure 7:
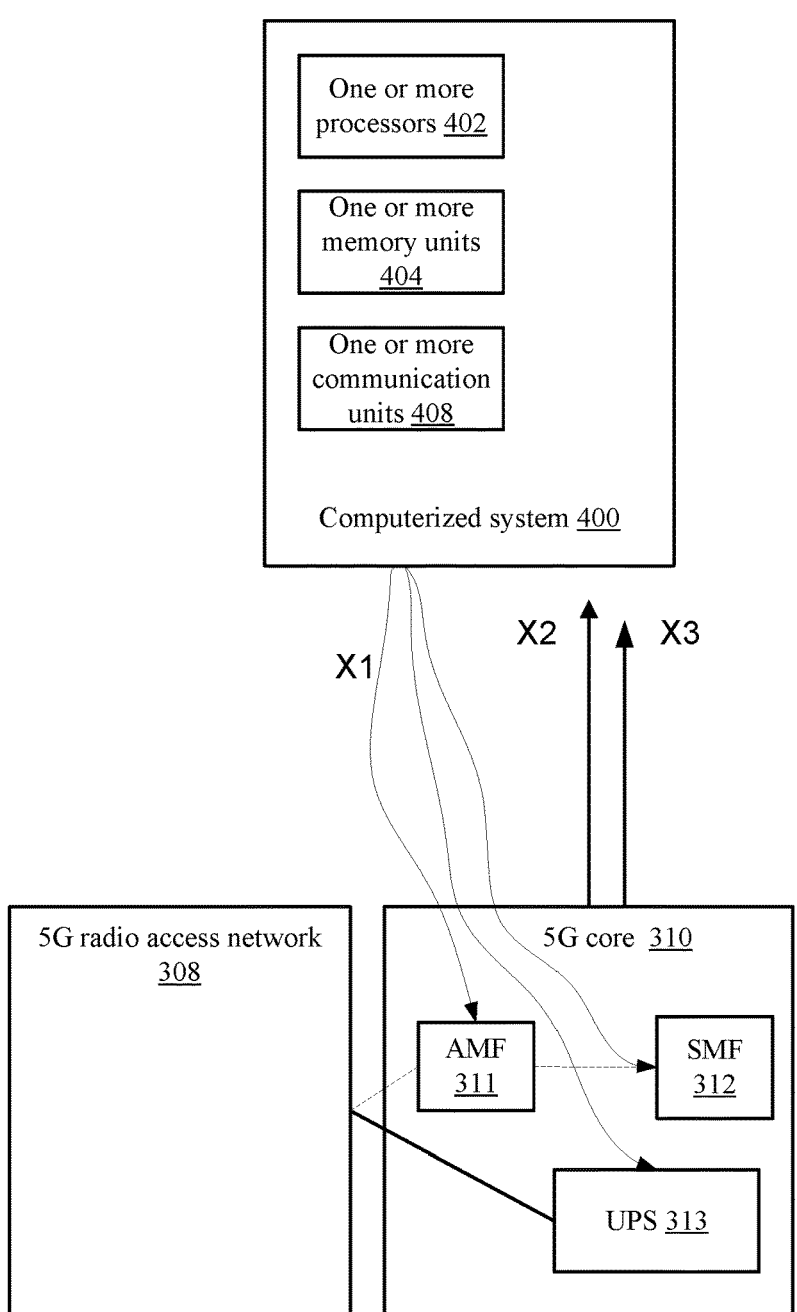
FIG. 7 illustrates an example of a system that communicated with a 5G cellular network.

FIG. 7 illustrates an example of a communication between the computerized system 400, using a privileged access, with a managed network control of a management network such as a 5G cellular network—that includes 5G core 310 (that includes AMF 311, SMF 312 and UPS 313) and 5G radio access network 308. FIG. 4 also illustrates various types of links and standard protocols such as X1, X2, X3.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A computerized method for detecting a remotely-controlled aerial vehicle (RCAV) related communication unit in one or more managed networks, the method comprises:

obtaining, using privileged access, communication related information about one or more members of the one or more managed networks;

searching for the RCAV related communication unit, wherein the searching is based, at least in part, on the communication related information and comprises searching for a communicated content that is RCAV related; and responding to a detecting of the RCAV related communication unit.

2. The computerized method according to claim 1, wherein the searching comprises searching for a member of the one or more managed networks that accessed an information resource that is RCAV related.

3. The computerized method according to claim 1, wherein the searching comprises searching for a member of the one or more managed networks that uses a communication protocol that is RCAV related.

4. The computerized method according to claim 1, wherein the searching comprises searching for a member of the one or more managed networks that comprises a communication unit of a type that is RCAV related.

5. The computerized method according to claim 1, wherein the searching comprises searching for a member of the one or more managed networks that is identified by an identifier that is RCAV related.

6. The computerized method according to claim 1, wherein the searching is also based on additional information that is not obtained using the privileged access.

7. The computerized method according to claim 1, wherein the searching comprises searching for a connection that has characteristics that are typical to RCAV related communication.

8. The computerized method according to claim 1, wherein the searching is based, at least in part, on movement information of a member of the one or more managed networks.

9. The computerized method according to claim 1, wherein the searching is based, at least in part, on location information of a member of the one or more managed networks.

10. The computerized method according to claim 1, wherein the searching is based, at least in part, on personal information regarding one or more persons related to a member of the one or more managed networks.

11. The computerized method according to claim 1, wherein the responding comprises generating and sending a RCAV indication.

12. The computerized method according to claim 1, wherein the responding comprises stopping a progress of a RCAV that comprises the RCAV related communication unit.

13. The computerized method according to claim 1, wherein the responding comprises stopping a progress of a RCAV that communicates with the RCAV related communication unit.

14. The computerized method according to claim 1, wherein the responding comprises disconnecting a RCAV related communication.

15. The computerized method according to claim 1, wherein the responding comprises disconnecting, using the privileged access, a RCAV related communication.

16. The computerized method according to claim 1, wherein the responding comprises altering a RCAV related communication.

17. The computerized method according to claim 1, wherein the responding comprises gaining control of a RCAV that comprises the RCAV related communication unit.

18. The computerized method according to claim 1, wherein the responding comprises gaining control of a RCAV that communicates with the RCAV related communication unit.

19. The computerized method according to claim 1, wherein the responding comprises verifying an identity of a RCAV related to the RCAV related communication unit.

20. The computerized method according to claim 19, wherein the verifying is followed by acting in response to an outcome of the verifying.

21. The computerized method according to claim 19, wherein the one or more managed networks are a plurality of managed networks.

22. The computerized method according to claim 21, wherein the obtaining comprises obtaining the communication related information during a roaming between managed networks of the plurality of managed networks.

23. The computerized method according to claim 1, wherein the responding comprises requesting the one or more managed network to change a mode of communication of a RCAV.

24. The computerized method according to claim 1, wherein the one or more managed networks comprise a cellular network.

25. The computerized method according to claim 1, wherein the one or more managed networks comprise a fifth generation (5G) cellular network.

26. The computerized method according to claim 1, wherein the responding is based, at least in part, on a location of a RCAV related to the RCAV related communication unit.

27. The computerized method according to claim 1, wherein the responding comprises facilitating one or more counter measures by affecting the communication of the RCAV related unit.

28. The computerized method according to claim 1, wherein the responding comprises verifying an identity of an operator of an RCAV related to the RCAV related communication unit.

29. The computerized method according to claim 1 wherein at least a part of the computerized network belongs to the managed network.

30. The computerized method according to claim 1 wherein the responding is also responsive to information obtained outside the one or more managed networks.

31. The computerized method according to claim 1 wherein the responding comprises transferring to another computerized entity information regarding the RCAV related communication unit.

32. The computerized method according to claim 1 wherein the obtaining is manually triggered.

33. The computerized method according to claim 1 wherein the obtaining is an outcome of searching after members that exhibit one or more parameters.

34. The computerized method according to claim 1 comprising obtaining, using the privileged access, additional information that differs from the communication related information.

35. The computerized method according to claim 1, wherein the responding comprises obtaining additional information.

36. The computerized method according to claim 1 wherein the responding comprises monitoring the one or more members.

37. The computerized method according to claim 1, wherein the one or more managed networks comprise a proprietary owned managed network.

38. The computerized method according to claim 1, wherein the one or more managed networks comprise an Amazon Prime Air network.

39. The computerized method according to claim 1, wherein the one or more managed networks comprise a U-Space network.

40. The computerized method according to claim 1, wherein the one or more managed networks comprise a UTM.

41. The computerized method according to claim 1, wherein the searching comprises searching for a RCAV related connection and analyzing content conveyed over the RCAV related connection.

42. A non-transitory computer readable medium detecting a remotely-controlled aerial vehicle (RCAV) related communication unit in one or more managed networks, the non-transitory computer readable medium stores instructions for:

obtaining, using privileged access, communication related information about one or more members of the one or more managed networks;

searching for the RCAV related communication unit, wherein the searching is based, at least in part, on the communication related information and comprises searching for a communicated content that is RCAV related; and responding to a detecting of the RCAV related communication unit.

43. A computerized system for detecting a remotely-controlled aerial vehicle (RCAV) related communication unit in one or more managed networks, the computerized system comprises:

one or more communication units that are configured to obtain, using privileged access, communication related information about one or more members of the one or more managed networks;

one or more processors that are configured to:

search for the RCAV related communication unit, wherein the searching is based, at least in part, on the communication related information and comprises searching for a communicated content that is RCAV related; and respond to the detecting of the RCAV related communication unit.

* * * * *